US006865679B1

(12) United States Patent
Dennison

(10) Patent No.: US 6,865,679 B1
(45) Date of Patent: Mar. 8, 2005

(54) METHOD, SYSTEM, AND PROGRAM FOR ACCESSING A SYSTEM WITHOUT USING A PROVIDED LOGIN FACILITY

(75) Inventor: Carl Michael Dennison, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,633

(22) Filed: Oct. 1, 1999

(51) Int. Cl.[7] .......................... G06F 11/30; G06F 15/16
(52) U.S. Cl. ...................... 713/200; 713/201; 713/202; 709/229
(58) Field of Search ................................. 713/200, 201, 713/202; 709/227, 228, 229, 202, 203

(56) References Cited

U.S. PATENT DOCUMENTS

| | | | |
|---|---|---|---|
| 5,249,293 A | | 9/1993 | Schreiber et al. |
| 5,452,459 A | | 9/1995 | Drury et al. |
| 5,764,887 A | | 6/1998 | Kells et al. |
| 5,786,771 A | | 7/1998 | Feeney et al. |
| 5,787,281 A | | 7/1998 | Schreiber et al. |
| 5,794,047 A | | 8/1998 | Meier |
| 5,802,371 A | | 9/1998 | Meier |
| 6,338,064 B1 | * | 1/2002 | Ault et al. ................... 707/9 |
| 6,553,403 B1 | * | 4/2003 | Jarriel et al. ............. 709/202 |
| 2002/0078365 A1 | * | 6/2002 | Burnett et al. ............ 713/200 |
| 2003/0093539 A1 | * | 5/2003 | Simeloff et al. .......... 709/229 |
| 2003/0105862 A1 | * | 6/2003 | Villavicencio ............ 709/203 |

OTHER PUBLICATIONS

Nathan, Jay, "15 Seconds: SharePoint Security and NET Impersonation", May 11, 2004, pp. 1–8.*
IBM Technical Disclosure Bulletin; Mapping of Distributed Computing Environment Identities to MVS Userids; vol. 38, No. 08, Aug., 1995, pp. 213–214.

IBM Technical Disclosure Bulletin; Distributed Computing Environment Application Enabler for OS/02 Cell Directory Client Cache; vol. 38, No. 06, Jun. 1995, p. 151.

IBM Technical Disclosure Bulletin; Migration Utility for Distributed Computing Environment Application Enabler for OS/2; vol. 38, No. 03, Mar. 1995, pp. 473–476.

IBM Technical Disclosure Bulletin; Providing Distributed Computeing Environment Client/Server Naming Capability in Inexpensive OS/2 Product; vol. 38, No. 03, Mar. 1995, pp. 519–520.

Authentication and Security Services—Introduction to Security Services; (c) 1997 The Open Group; pp. 1–116.

* cited by examiner

*Primary Examiner*—Andrew Caldwell
*Assistant Examiner*—Courtney D. Fields
(74) *Attorney, Agent, or Firm*—David W. Victor; Konrad Raynes & Victor LLP

(57) ABSTRACT

Disclosed is a method, system, and program for accessing a control system, such as a printing systems manager (PSM) in a server from a client computer. The control system includes a logon program to allow a client side of the control system executing in the client computer use a terminal emulation program to access a client process executing in the server to perform control system operations. The client requests security context for the client including authorization, such as a Distributed Computing Environment (DCE) type authorization, to allow the client to access control system functions in the server. The server returns the requested security context to the client. A client program executing in the client transmits a control system command and the security context to access the server control system.

30 Claims, 3 Drawing Sheets

US 6,865,679 B1

METHOD, SYSTEM, AND PROGRAM FOR ACCESSING A SYSTEM WITHOUT USING A PROVIDED LOGIN FACILITY

BACKGROUND OF THE INVENTION

1. Field of the Invention

The present invention relates to a method, system, and program for accessing from a client a control system in a server and, in particular, accessing a printing systems manager server to perform printer related operations.

2. Description of the Related Art

Network printing systems generally comprise an assemblage of different printers, client computers, servers, and other components connected over a network. A print job is assembled at a client computer and transmitted over the network to a server linked to a variety of printers. To route print jobs through a network printing system, International Business Machines Corporation (IBM) provides Printing Systems Manager (PSM) products that provide centralized and distributed management of a network printing system. A PSM server manages the flow of print jobs and ensures that a print job is routed to a printer that can handle the job. The PSM system operates in the UNIX operating system environment. The IBM version of the PSM server utilizes the IBM AIX operating system.

In the PSM printing environment, a systems administrator may manage a network of printers, servers, queues, and print jobs from any AIX client, which is the operating system on which the PSM operates and manages the network printing environment. PSM provides remote management of the print system throughout the network. Remote users, administrators and other clients would use a terminal emulation (TELNET) program to logon to the PSM server using the DCE protocol. The PSM client then communicates with a PSM AIX client daemon executing on the PSM server. The user communicates PSM commands, including print operations and administrative commands, such as generating print requests, track print jobs, cancel, modify, or resubmit those jobs, query printers, and reconfigure different print objects, to the PSM AIX client daemon to execute. To communicate with the PSM server, the user at the client can use either the PSM graphical user interface (GUT) or the PSM command line to monitor and configure the PSM servers, printers, and print resources. Further details of the PSM environment are described in the IBM publication "Printing Systems Manager: Overview, Version 1.2.1", IBM document no. G544-3962-02 (IBM Copyright, 1996), which publication is incorporated herein by reference in its entirety.

The PSM system utilizes the IBM Distributed Computing Environment (DCE) to provide for secure access of PSM resources and distributed computing. A DCE administrator can create groups of users that are allowed access to printer related operations and printer objects. For instance, only members of a certain group may be allowed to print on certain printers and only specified members of a systems administrator group may perform such administrative tasks as creating, deleting, modifying or configuring print objects. Further details of how the DCE protocol is used to provide secure access of PSM resources is described in the IBM publication "Administrating IBM Printing Systems Manager for AIX Version 1.2.1," IBM document no. S544-396402 (IBM Copyright, 1996), which publication is incorporated herein by reference in its entirety.

To login, the user must obtain a network: login context which contains the information necessary for a subject to become a client in the DCE security environment. Once logged-on, the user may interact directly with the particular proprietary PSM system through the PSM AIX client daemon. After logging in and providing a password, the DCE login facility would initialize the login context for the client wanting to access the PSM server, and authenticate and validate the login context. The client then uses the sec__login__export__context( ) API call to obtain the login context. After obtaining the login context string, the client must present this string to access any resource when operating in the PSM DCE environment. When performing an operation, the client would present the login context string to the PSM AIX client daemon. The PSM AIX client daemon then makes a call to sec__login__import__context( ) to access the client's credential's file to determine whether the client has authority to perform th requested operation. Once the client obtains the login context, the client may make calls to various PSM services, which call the export context to determine whether the client has authority to access the requested service. Details of a client logging into the host AIX system in the DCE environment are described in the description of the login facility using sec__login API in the publication "CAE Specification, DCE 1.1: Authentication and Security Services," Document Number: C311 (Copyright The Open Group 1997), which publication is incorporated herein by reference in its entirety.

One limitation with the current system is that after logging onto the PSM host and obtaining a login context, the client must utilize the PSM AIX command line or PSM AIX GUI interface to interface with the PSM server as the client is using a Telnet program for access. Further, the client can only access the PSM server through the PSM client daemon when logged onto the PSM server. The user cannot use the client operating system and interface programs to access the PSM server. Thus, the client and PSM client daemon are restricted to operate on the same AIX host due to the nature of the DCE login facility, sec__login, to establish a login context. This environment is not truly distributed as the client must operate from within the PSM server host.

There is thus a need in the art for an improved method to allow clients to obtain a login context and access the PSM server without having to operate from within the host of the PSM server.

SUMMARY OF THE PREFERRED EMBODIMENTS

Current host login techniques enable the client as a DCE client in a manner that allows the client to communicate with a host server over a socket, such as a TCP/IP socket using the host specific protocol, which may be proprietary. Preferred embodiments provide a mechanism to allow a remote client to open a line of communication with the host server without having to logon to the host system using a terminal emulation program and without having to develop an entire new interface, such as a whole separate DCE Remote Procedure Call (RPC) interface, to allow the client to access all the services offered by the host.

To provide an alternative mechanism for accessing proprietary systems, preferred embodiments disclose a method, system, and program for accessing a control system in a server from a client computer. The control system includes a logon program to allow a client side of the control system executing in the client computer use a terminal emulation program to access a client process executing in the server to perform control system operations. The client requests security context for the client including authorization to allow the client to access control system functions in the server. The server returns the requested security context to the client. A client program executing in the client transmits a control system command and the security context to access the server control system.

In further embodiments, requesting the security context comprises the client requesting the server to impersonate the client to obtain the security context. The server impersonating the client accesses the security context to return to the client.

In yet further embodiments, the client computer includes a different operating system than the server. The client program interacts with the client process executing in the server to perform control system operations.

In certain embodiments, the control system is a printing systems manager to control printers and printer related objects managed by the server.

Oftentimes proprietary systems provide a login facility, such as the DCE sec_login facility, to allow client computers to access the proprietary system using a terminal emulation program. All security in such systems is verified through the login facility. Preferred embodiments provide a mechanism for a client computer to obtain its security context without having to directly logon through a terminal emulation program to the server system. The client could then use this security context to access commands and operations within the proprietary system commensurate with the security context without having to Telnet into the proprietary system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
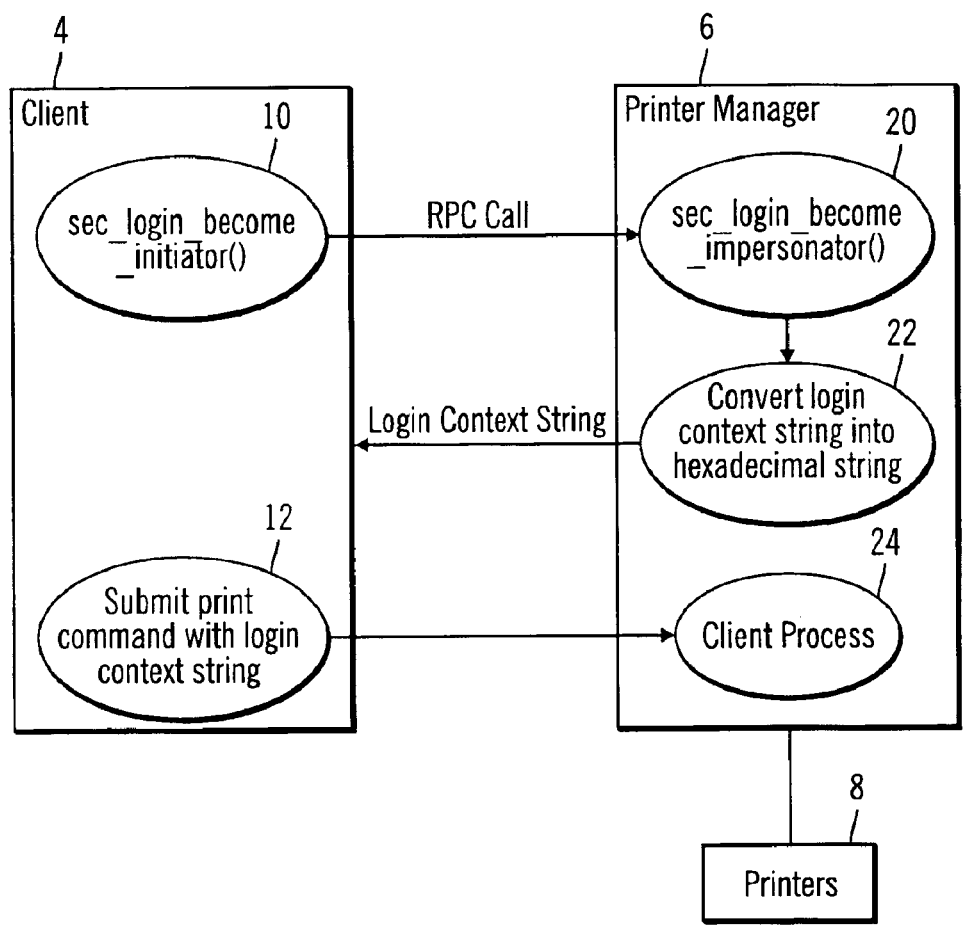
FIG. 1 is a block diagram illustrating a computing environment in which preferred embodiments of the present invention are implemented.

FIG. 1 illustrates a computing environment in which preferred embodiments of the present invention are implemented. A client computer 4 is in communication with a printer manager 6 via a network. The client computer 4 may be comprised of any computer device known in the art, including any operating system known in the art, e.g., OS/2, LINUX, WINDOWS, etc. The term client 4 as used herein refers to both the physical client computer and a process executing in the client 4. The printer manager 6 may be implemented in a printer management server software, such as the PDSERVER program included in the IBM InfoPrint Manager software, the PSM system, etc. For instance, the PDSERVER process in InfoPrint Manager manages communication with the client 4 and printers 8, and performs printer management operations. Thus, the printer manager 6 and client 4 may include different operating systems. For instance, the client 4 may include a personal computer type operating system and the printer manager 6 may include a server oriented operating system, such as AIX WINDOWS NT, etc. The client 4 and printer manager 6 may communicate via any suitable network architecture (not shown) known in the art, such as LAN, Ethernet, WAN, System Area Network (SAN), Token Ring, TCP/IP, the Internet, etc. Alternatively, there may be separate and different networks between the client 4 and printer manager 6. The printer manager 6 controls access to printers 8, and manages printer related objects such as queues, etc. The user may seek to access the printer manager 6 to perform printer management and configuration operations, such as deleting, modifying, and creating printer related objects or submitting print jobs.

FIG. 1 shows the application program interface (API) calls made in the client 4 and server 6 to obtain the login context for the client. The client 4 includes a sec_login_ become_initiator( ) call 10 which constructs a login context to enable the printer manager 6 to impersonate the client 4 for the purpose of obtaining the login context string. The client 4 further includes the capability to build a command 12, including the login context string, which the client 4 communicates to the printer manager 6 to access the proprietary printer manger 6 commands and resources. The printer manager 6 includes a sec_login_become_ impersonator( ) call 20 to allow the printer manager 6 to impersonate the client 4 and a routine 22 to convert the login context to a hexidecimal representation of the pointer. The login context string points to the client credential information including the access for which the client is authorized in the printer manager 6. The printer manager 6 includes a client program 24 that processes printer manager commands and requests from a user at the client 4. The client program 24 may comprise the PSM AIX client daemon or the component of the PDSERVER that interfaces with client 4 requests. Upon receiving a command and login from the user, the client program 24 converts the hexidecimal context string in the submitted command 12 into a binary address that points to a client 4 credential object to determine whether the user is authorized to perform the requested operations. The client 4 would present this login context string whenever attempting any printer manager 6 operations, such as configuring printer objects.

Figure 2:
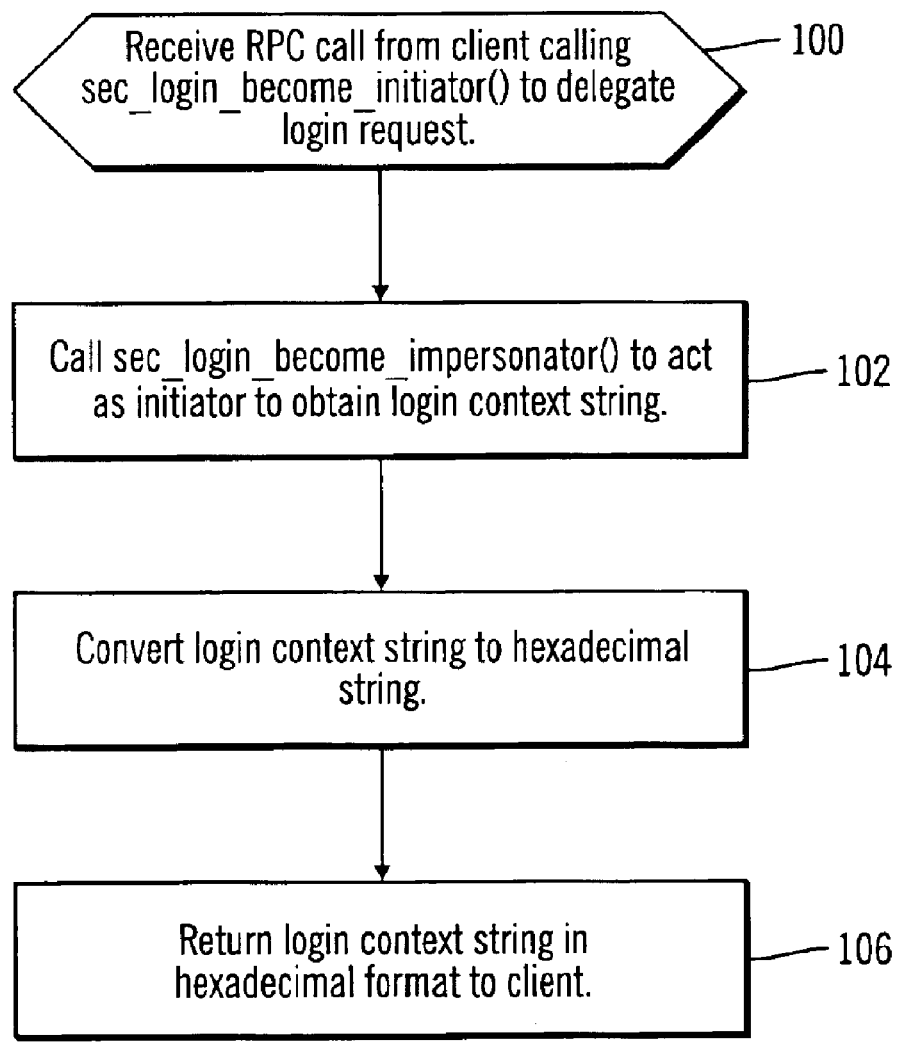
FIGS. 2 and 3 illustrate logic implemented in the printer manager to provide the client with its login context string in accordance with preferred embodiments of the present invention.

FIG. 2 illustrates logic implemented in the printer manager 6 to obtain and return to the client the login context string, which comprises a pointer to the client credential information in the printer manager 6. Initially, the user would logon to the DCE security services of the printer manager 6 to obtain an extended privilege attribute certificate (EPAC) to make an RPC call to the printer manager 6 in a manner known in the art. Details of logging on to make an RPC are described in the IBM publication "IBM Distributed Computing Environment for AIX Version 2.2: Introduction to DCE" (IBM Copyright 1998), which publication is incorporated herein by reference in its entirety. After obtaining the EPAC, the client 4 would make a sec_login_ become_initiator( ) 10 RPC call to the printer manager 6 to delegate its identity to the printer manager 6 for the purpose of obtaining the context login string. With respect to FIG. 2, the printer manager 6 receives the RPC call from the client 4 at block 100 and in response makes a call (at block 102) to the sec_login_become_impersonator( ) 20 to become an impersonator of the client 4. The output of the sec_login_ become_impersonator( ) 20 is the login context handle for the client 4. The printer manager 6 then converts (at block 104) the login context handle, which is a binary address, into a hexidecimal format and returns (at block 106) the login context to the client 4 as part of the RPC call initiated by the client. In this way, the client delegates authority to the printer manager to access the client 4's login context string on behalf of the user. With this set of function calls, the client 4 obtains its login context string so the user does not have to logon onto the printer manager 6 host using an existing login facility using terminal emulation (Telnet). In this way, the user is not limited to running programs on the host.

Figure 3:
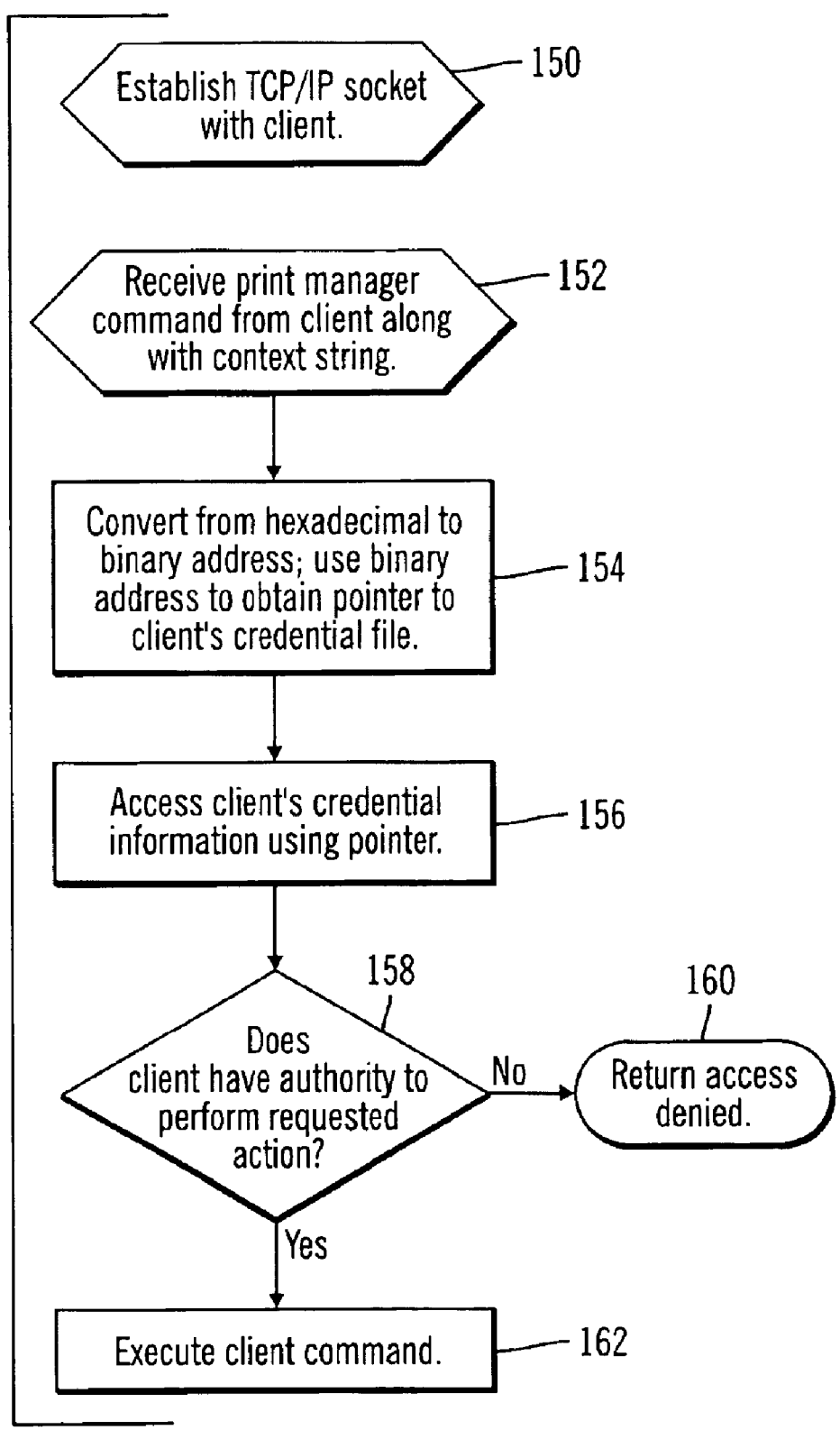

To access the printer manager 6, the client 4 would then send the login context string to the printer manager 4 with a print related command in the proprietary language of the local printer manager 6 system, e.g., an InfoPrint command. FIG. 3 illustrates logic implemented in the client process 24 component of the printer manager 6 to handle a request from the user. In preferred embodiments, the client process 24 interacts with the client 4 directly, without requiring the user having to logon using the logon facility and limiting the user to running programs in the host printer manager 6. With preferred embodiments, the user may use client 4 programs, GUIs, and interfaces to interact with the client process 24 and execute those client 4 programs at the client 4 system. When receiving a print function request along with the login context string, the client process 24 would determine whether to execute the requested action. Initially (at block 150), the client 4 establishes a TCP/IP socket with the client process 24 to communicate printer commands to the printer manager 4 using the proprietary printer manager system of the vendor, e.g., IBM, Hewlett-Packard, etc. At block 152, the printer manager 4 receives from the client 4 the printer manager 6 command along with the login context string. The client process 24 converts the login context string, which is in a hexadecimal format, to a binary number which points to the credential information of the client 4. The client process 24 accesses the client's 4 credential information (at block 156) and determines (at block 158) whether the client 4 credentials provide authority to invoke the requested printer manager 6 command. If not, then the printer manager 6 returns access denied to the client 4. Otherwise, if the client 4 has authorization to perform the requested action, then the client process 24, which would also interact with clients 4 logged onto the system through a logon facility, e.g., the PSM AIX client daemon, would execute (at block 162) the client 4 command. For instance, the client 4 may request an administrative command such as a PDDELETE command to delete printer queues and logical and physical printer objects. The client 4 may request any other printer manager 6 command known in the art.

In this way, with preferred embodiments the user can access the printer manager 4 proprietary system through the already existing interface and execute printer manager commands without having to logon to the host of the printer manager 6 using a Telnet program. Instead, with preferred embodiments, the user can utilize the client environment, e.g., GUIs and operating system, to communicate printer manager 6 commands directly to the client process 24 component of the printer manager 6 to perform printer manager operations. In the prior art, the user would have to logon to the printer manager 4 and run operations directly on the printer manager 6 server through some client process 24, such as the PSM AIX client daemon, to access the printer manager resources and objects.

Preferred embodiments provide a single RPC call from the client 4 to the printer manager 6 to obtain the login context string by having the printer manager 6 impersonate the client to obtain the context string and pass back to the client 4. The user of the client 4 may then present the context string to execute particular printer manager commands on the printer manager 4. This is an improvement over the prior art because the user does not need to directly logon to the printer manager 6 host using terminal emulation, such as the case with the PSM server. Instead, the client utilizes a single RPC call to obtain the login context string to then use to access the printer manager 6 system. This preferred embodiment access method allows users to use a current proprietary printer management system, such as the InfoPrint or PSM servers through the existing interface, e.g., PDSERVER, the PSM AIX daemon, without having to logon to the host using Telnet and without having to abandon the current client process 24, e.g., the PSM AIX daemon, and develop an entirely new system of RPC interfaces to all the printer manager commands. Instead, only a single RPC call is provided to allow the client 4 to access security context needed to access the proprietary system.

The preferred embodiments are particularly useful because many proprietary systems utilize a login facility to allow users to logon via Telnet to a server to run operations directly on the host system. In such systems, users often can only utilize programs and user interfaces on the host system. Preferred embodiments provide a technique for obtaining the login context string without having to directly logon to the system. Once the client obtains its login context, it may be used for the entire login session (typically, the user's "login shell" and its child processes (recursively)).

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to accessing a printer manager environment to perform local PSM printing operations. However, the preferred embodiment method and protocol for accessing the login context string can be applied to any proprietary control system to allow access to obtain the login context without having to login directly to the host of the proprietary control system.

Preferred embodiments were described with respect to the DCE authentication and security services for establishing a login session to access a server system from a client. However, the preferred embodiment method for bypassing the login facility may be applied to any authentication system which requires users to logon to a host in order to obtain an authentication ticket to access services while logged onto the host. Thus, the login context string may comprise any security context or authorization ticket known in the art for determining whether a client may access particular services and resources.

Preferred embodiments were described as implemented in the IBM InfoPrint Manager system, using the AIX operating system, which is the IBM version of UNIX. However, the preferred embodiments would apply to any type of vendor proprietary printer management system or implementation of Unix or any other operating system.

In summary, preferred embodiments disclose a disclose a method, system, and program for accessing a control system in a server from a client computer. The control system includes a logon program to allow a client side of the control system executing in the client computer use a terminal emulation program to access a client process executing in the server to perform control system operations. The client requests security context for the client including authorization to allow the client to access control system functions in the server. The server returns the requested security context to the client. A client program executing in the client transmits a control system command and the security context to access the server control system.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing a control system in a server from a client, wherein the control system includes a logon program to enable the client to use a terminal emulation program to logon to the server to access a client process executing in the server to perform control system operations, further comprising:

requesting, with the client, a security context for the client including authorization to allow the client to access control system functions in the server, wherein the security context is associated with a client credential information including access for which the client is authorized;

impersonating the client, by the server, to generate the security context;

returning, with the server, the generated security context to the client;

transmitting, with a client program executing in the client, a control system command and the security context to access the control system in the server;

based on the control system command, reconfiguring a printer object, wherein the requesting, the impersonating, the returning, the transmitting, and the reconfiguring are performed without using the logon program to enable the client to logon to the server.

2. The method of claim 1, wherein requesting with the client comprises the client requesting the server to impersonate the client to obtain the security context, further comprising accessing, with the server impersonating the client, the security context to return to the client.

3. The method of claim 2, wherein the Distributed Computing Environment (DCE) protocol is used to provide the client security context, wherein the client uses the sec_login_become_initiator DCE command to request the server to impersonate the client, wherein the saver uses the sec_login_become_impersonator DCE command to impersonate the client to obtain the security context.

4. The method of claim 1, further comprising:

converting, with the server, the security context transmitted through the client program to a pointer to credential information of the client;

determining from the credential information, with the server, whether the client is authorized to invoke the transmitted control system command; and executing, with the server, the control system command transmitted by the client if the client is authorized to invoke the command.

5. The method of claim 1, wherein the client computer includes a different operating system than the server, wherein the client program executing in the client interacts with the client process executing in the server to perform control system operations.

6. The method of claim 1, wherein the client requests the security context through a remote procedure call.

7. The method of claim 1, wherein the control system is a printing systems manager to control printers and printer related objects managed by the server.

8. The method of claim 7, wherein the printer system manager command transmitted by the client comprises a command to reconfigure at least one printer object, thereby allowing the client computer to perform administrative functions.

9. A system for accessing a control system in a server from a client, wherein the control system includes a logon program to enable the client to use a terminal emulation program to logon to the server to access a client process executing in the server to perform control system operations, further comprising:

means for requesting a security context for the client including authorization to allow the client to access control system functions in the server, wherein the security context is associated with a client credential information including access for which the client is authorized;

means for impersonating the client, by the server, to generate the security context;

means for returning the generated security context to the client;

means for transmitting with a client program executing in the client a control system command and the security context to access the control system in the server; and means for reconfiguring a printer object, wherein the requesting, the impersonating, the returning, the transmitting, and the reconfiguring are performed without using the logon program to enable the client to logon to the server, and wherein reconfiguration of the at least one printer object is based on the control system command.

10. The system of claim 9, wherein the means for requesting the security context comprises the server impersonating the client to obtain the security context, further comprising means for accessing, with the server impersonating the client, the security context to return to the client.

11. The system of claim 10, wherein the Distributed Computing Environment (DCE) protocol is used to provide the client security context, wherein the client uses sec_login_become_initiator DCE command to request the server to impersonate the client, wherein the server uses the sec_login_become_impersonator DCE command to impersonate the client to obtain the security context.

12. The system of claim 9, further comprising:

means for converting the security context transmitted through the client interface to a pointer to credential information of the client;

means for determining from the credential information whether the client is authorized to invoke the transmitted control system command; and means for executing the control system command transmitted by the client if the client is authorized to invoke the command.

13. The system of claim 9, wherein the client computer includes a different operating system than the server, wherein the client program is part of the client operating system, and wherein the client program interacts with the client process executing in the server to perform control system operations.

14. The system of claims 9, wherein the client requests the security context through a remote procedure call.

15. The system of claim 9, wherein the control system is a printing systems manager to control printers and printer related objects managed by the server.

16. The system of claim 15, wherein the printer system manager command transmitted by the client comprises a command to reconfigure at least one printer object, thereby allowing the client computer to perform administrative functions.

17. An article of manufacture for use in accessing a control system in a server from a client, wherein the control system includes a logon program to enable the client to use a terminal emulation program to logon to the server to access a client process executing in the server to perform control system operations, the article of manufacture comprising computer usable media including computer programs embedded therein that cause the client and server computer to perform:

requesting, with the client, a security context for the client including authorization to allow the client to access control system functions in the server, wherein the security context is associated with a client credential information including access for which the client is authorized;

impersonating the client, by the server, to generate the security context;

returning with the server, the generated security context to the client;

transmitting, with a client program executing in the client, a control system command and the security context to access the control system in the server; and based on the control system command, reconfiguring a printer object wherein the requesting the impersonating, the returning, the transmitting, and the reconfiguring are performed without using the logon program to enable the client to logon to the server.

18. The article of manufacture of claim 17, wherein requesting the security context comprises the client requesting the server to impersonate the client to obtain the security context, further comprising accessing, with the server impersonating the client, the security context to return to the client.

19. The article of manufacture of claim 18, wherein the Distributed Computing Environment (DCE) protocol is used to provide the client security context, wherein the client uses the sec_login_become_initiator DCE command to request the server to impersonate the client, wherein the servo uses the sec_login_become_impersonator DCE command to impersonate the client to obtain the security context.

20. The article of manufacture of claim 17, further causing the server to perform:

converting the security context transmitted through the client programs to a pointer to credential information of the client;

determining from the credential information whether the client is authorized to invoke the transmitted control system command; and executing the control system command transmitted by the client if the client is authorized to invoke the command.

21. The article of manufacture of claim 17, wherein the client computer includes a different operating system than the server, wherein the client program executing in the client interacts with the client process executing in the server to perform control system operations.

22. The article of manufacture of claim 17, wherein the client requests the security context through a remote procedure call.

23. The article of manufacture of claim 17, wherein the control system is a printing systems manager to control printers and printer related objects managed by the server.

24. The article of manufacture of claim 23, wherein the printer system manager command transmitted by the client comprises a command to reconfigure at least one printer object, thereby allowing the client computer to perform administrative functions.

25. The method of claim 1, wherein the server comprises a printer manager executing in a first operating system, wherein the first operating system is different from a second operating system executing in the client, wherein the printer manager is implemented in a printer management server software, wherein the client accesses the printer manager to perform printer management and configuration operations including deleting, modifying, and creating printer objects, and submitting print jobs, and wherein the printer manager impersonates the client to generate the security context.

26. The method of claim 25, wherein an user on the client does not have to logon onto the printer manager by using an existing login facility, and wherein the client sends the security context to the printer manager with a print command in a language of the printer manager.

27. The system of claim 9, wherein the server comprises a printer manager executing in a first operating system, wherein the first operating system is different from a second operating system executing in the client, wherein the printer manager is implemented in a printer management server software, wherein the client accesses the printer manager to perform printer management and configuration operations including deleting, modifying, and creating printer objects, and submitting print jobs, and wherein the printer manager impersonates the client to generate the security context.

28. The system of claim 27, wherein an user on the client does not have to logon onto the printer manager by using an existing login facility, and wherein the client sends the security context to the printer manager with a print command in a language of the printer manager.

29. The article of manufacture of claim 17, wherein th server comprises a printer manager executing in a first operating system, wherein the first operating system is different from a second operating system executing in the client, wherein the printer manager is implemented in a printer management server software, wherein the client accesses the printer manager to perform printer management and configuration operations including deleting, modifying, and creating printer objects, and submitting print jobs, and wherein the printer manager impersonates the client to generate the security context.

30. The article of manufacture of claim 29, wherein an user on the client does not have to logon onto the printer manager by using an existing login facility, and wherein the client sends the security context to the printer manager with a print command in a language of the printer manager.

* * * * *

UNITED STATES PATENT AND TRADEMARK OFFICE
CERTIFICATE OF CORRECTION

PATENT NO. : 6,865,679 B1
DATED : March 8, 2005
INVENTOR(S) : Dennison

It is certified that error appears in the above-identified patent and that said Letters Patent is hereby corrected as shown below:

Column 7,
Line 50, after "server;" insert -- and --.
Line 65, delete "saver" and insert -- server --.

Column 9,
Line 59, delete "servo" and insert -- server --.

Signed and Sealed this

Twentieth Day of December, 2005

JON W. DUDAS
*Director of the United States Patent and Trademark Office*